(No Model.) 4 Sheets—Sheet 2.

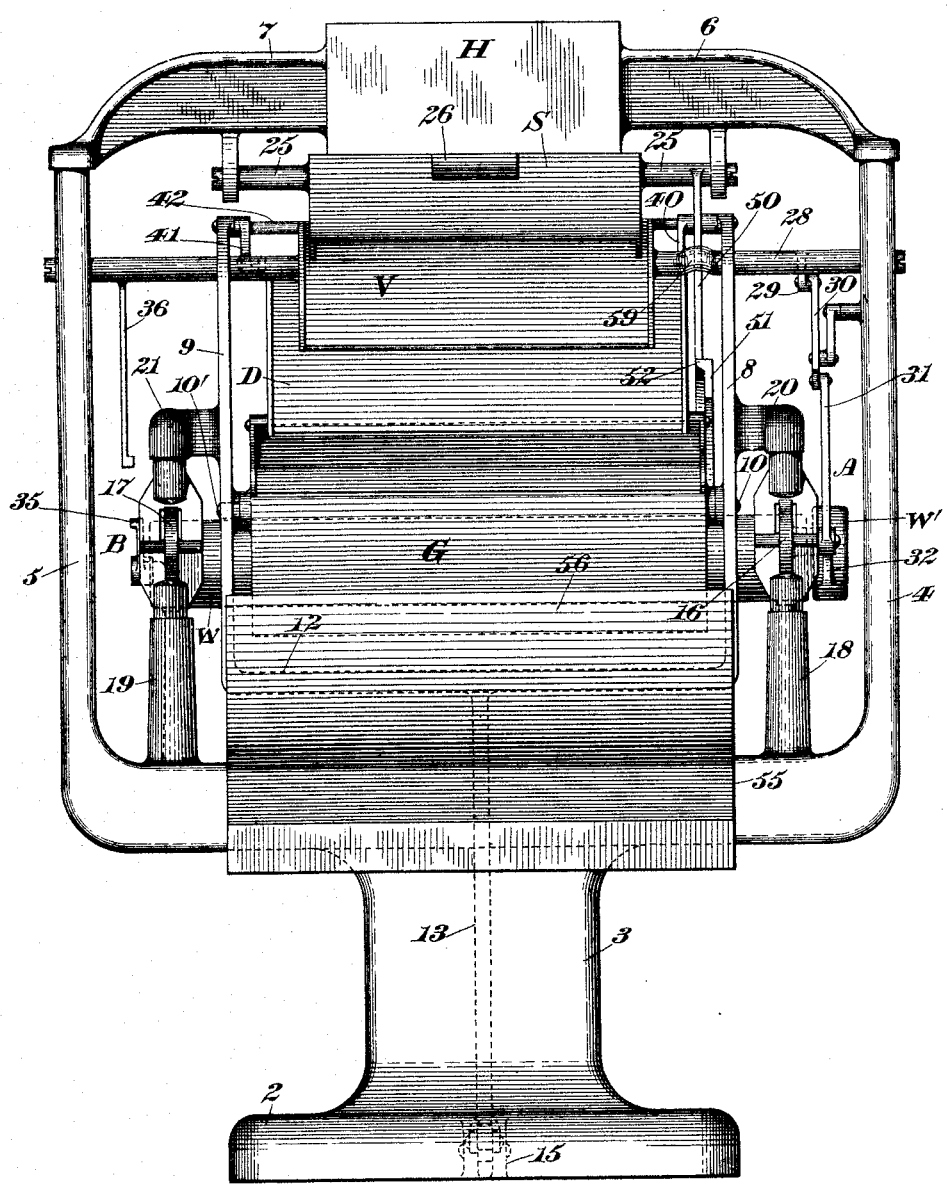

F. H. RICHARDS.
WEIGHING APPARATUS.

No. 585,981. Patented July 6, 1897.

Witnesses;
O.W. Smith
Fred. J. Dole.

Inventor;
F.H. Richards.

(No Model.)　　　　F. H. RICHARDS.　　4 Sheets—Sheet 3.
WEIGHING APPARATUS.

No. 585,981.　　　　　Patented July 6, 1897.

Witnesses;　　　　Inventor;
O. W. Smith　　　　F. H. Richards.
Fred. J. Dole.

(No Model.) 4 Sheets—Sheet 4.
F. H. RICHARDS.
WEIGHING APPARATUS.

No. 585,981. Patented July 6, 1897.

Witnesses;
O. W. Smith
Fred. J. Dole.

Inventor;
F. H. Richards.

UNITED STATES PATENT OFFICE.

FRANCIS H. RICHARDS, OF HARTFORD, CONNECTICUT.

WEIGHING APPARATUS.

SPECIFICATION forming part of Letters Patent No. 585,981, dated July 6, 1897.

Application filed March 11, 1897. Serial No. 626,959. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing Apparatus, of which the following is a specification.

This invention relates to weighing apparatus, the object being to provide an improved apparatus of this character more especially intended for use in stores, where it can be set upon a counter and weigh and deliver to suitable receptacles, such as boxes, bags, &c., various sorts of materials in comparatively small quantities.

Figure 5:
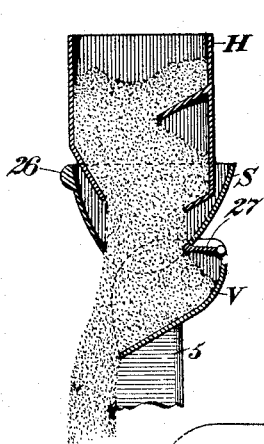
Figure 2:
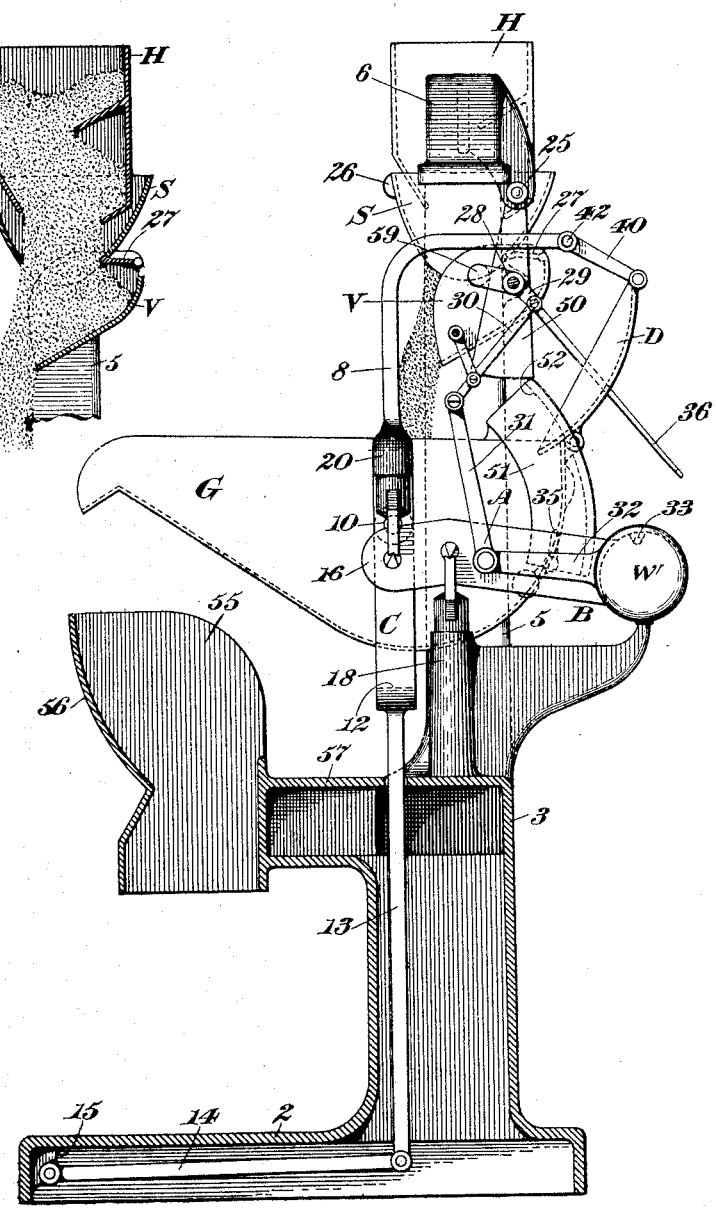
Figure 6:
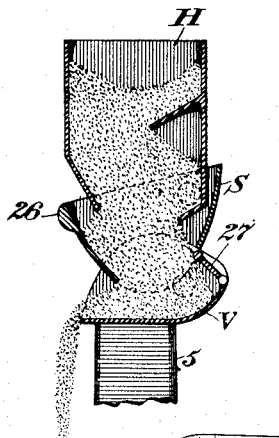
Figure 3:
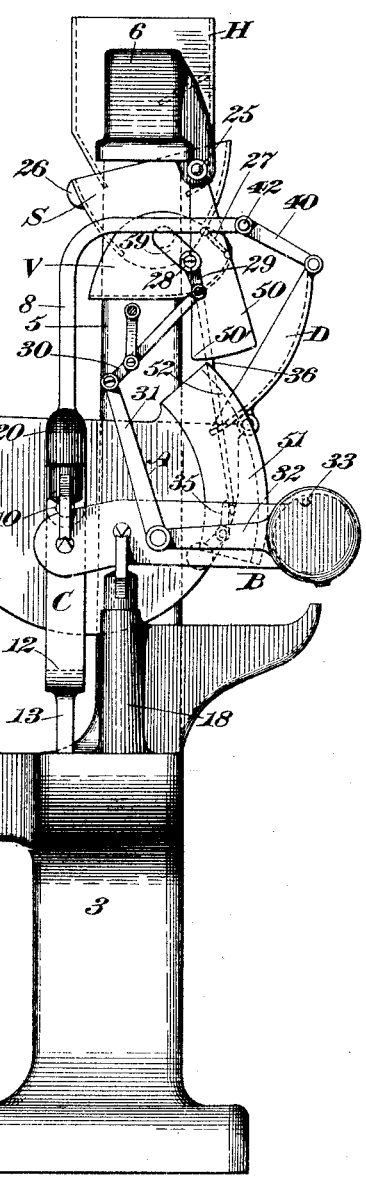
Figure 7:
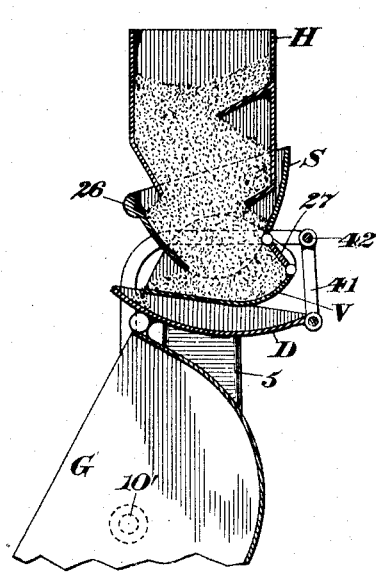
Figure 4:
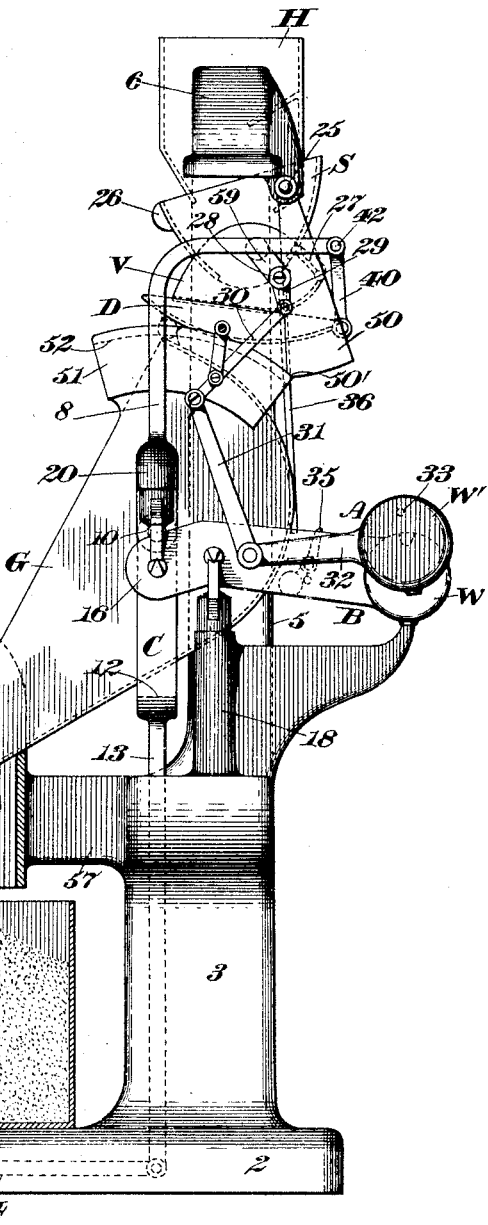

In the drawings accompanying and forming part of this specification, Figure 1 is a front elevation of my improved apparatus. Figs. 2, 3, and 4 are end elevations of the apparatus as seen from the right in Fig. 1 and represent the several positions occupied thereby during the making and discharging of a load. Figs. 5, 6, and 7 are longitudinal central sections of the supply mechanism in positions corresponding, respectively, with Figs. 2, 3, and 4, a portion of the load-receiver and the drizzle-catching device being shown in longitudinal central section in Fig. 7.

Similar characters designate like parts in all the figures of the drawings.

The framework is represented herein consisting of the wide base or bed 2, which can be set upon a counter and which is adapted to support a suitable receptacle, such as R, (see Fig. 4,) the column or upright 3 and the frame members or branches 4 and 5 constituting suitable means for supporting the several parts of the weighing mechanism.

The weighing mechanism, as is usual, consists of a load-receiver and a supporting scale-beam therefor, said load-receiver being designated by G and being of the "oscillatory" or "tilting" type, and its scale-beam by B.

The hopper H constitutes a convenient means for delivering a stream of material to the load-receiver, said hopper having the oppositely-disposed brackets 6 and 7, which are mounted on the frame members 4 and 5 and are secured thereto in some suitable manner.

As a means for supporting the load-receiver G a carrier, as C, is provided, said carrier having the vertical arms 8 and 9, respectively, which are adapted to receive the projecting trunnions or journals 10 and 10', respectively, extending laterally from the opposite ends of the load-receiver G, (see Fig. 1,) said vertical arms being joined at the lower end thereof by the transverse bar 12, from which depends the rod 13, the several parts of the carrier C being preferably made in one piece. Suitable means will be furnished for guiding the carrier C as it reciprocates, the guide-link 14 being represented for this purpose, said link being pivoted to the lower end of the bar 13 and also to a lug, as 15, on the inside of the front wall of the hollow base 2, it being understood that the lower portion of the standard 3 is chambered or hollow to permit the bar 13 to pass therethrough.

The scale-beam B consists of the longitudinal arms 16 and 17, which are joined at the rear by the cylindrical weight W, said arms being pivotally mounted on suitable posts or uprights, as 18 and 19, which can be cast on the respective frame members 4 and 5, said posts being preferably provided with rearwardly-extending brackets of suitable construction adapted to sustain the weight W when the latter is in its normal position, as indicated in Fig. 2.

The upright arms 8 and 9 of the carrier C are furnished with projections 20 and 21 on their outside faces, to which are connected in some well-known manner the usual V-shaped bearings, which are sustained by the ordinary pivots or knife-edges at the outer ends of the two beam-arms.

The load-receiver G will be tilted to discharge its contents into the receptacle R and will be returned to its normal position by hand, and for the purpose of maintaining said load-receiver in each of said positions its center of gravity and its center of oscillation will be coincident, whereby the load-receiver has no tendency in itself to tilt or to return to its normal position when its contents have been discharged.

The supply apparatus for the load-receiver includes the hopper H, the oscillatory valve V, and the interposed swinging spout S, the latter, as the weighing mechanism descends, being adapted to deliver the downflowing stream from the hopper H to the valve V, which is being closed during such action of the weighing mechanism, it being understood that the valve V directs the stream into the load-receiver G.

The swinging spout S has its center of oscillation near the rear of the hopper H, it being carried by the two-part shaft 25, which has recesses in its opposite ends to receive suitable pivots carried by arms depending from the brackets 6 and 7, respectively.

By reason of the location of the axis of the spout it is self-shifting, but for the purpose of facilitating this operation a weight, as 26, will be suitably attached to the front wall of the spout near its upper end, the movement of the spout being preferably controlled by the valve V.

A plate is represented at 27, pivoted, respectively, to the lower end of the rear wall of the spout and to the upper end of the rear wall of the valve, said plate constituting a convenient connection between the parts and also a means to prevent the material from working over the end of the valve when it is closed, as indicated in Fig. 7.

The valve V, which is oscillatory beneath the outlet of the spout S, depends from the two-part shaft 28, the latter having its ends suitably shaped to receive pivots on the frame members 4 and 5, respectively.

The valve V will be connected with the weighing mechanism for operation, the valve-shaft 28 having the crank-arm 29, which is pivoted to the link 30, the latter likewise being connected with the arm 31 of the auxiliary scale-beam or valve-actuator A, which is in the form of an angle-lever shiftably supported on the arm 16. The lever A is pivoted to the beam-arm 16 at its angle, and the arm 32 of said lever is furnished with the weight W', which is normally added to the weight W of the main beam B, said weight W' having a projecting pin or stop 33, which lies in a recess on the adjacent face of the beam-weight W, whereby on the downstroke of the beam B on the poising side thereof the arm 31 of said lever constitutes in effect a fixed upright on said beam B.

Fig. 2 represents the valve V and the spout S occupying their normal positions, the load-receiver G being empty, whereby a stream of material flowing from the hopper H will pass through the spout S to the valve V, which directs it to the load-receiver G. When a certain proportion of the load has been received by the load-receiver G, it, with the poising side of the beam B, will descend, the counterpoising side of said beam, or that part thereof between its fulcrum and weight W, being caused to ascend, so that the arm 31 will be raised and simultaneously swung to the left, rocking the link 30, the crank-arm 29, and consequently the rock-shaft 28 therewith, so that the valve will be forced to its closed position as the load-receiver descends, and simultaneously with this action the spout S will be swung rearward to deliver the stream to the rear of the valve, the spout and valve combining to reduce the stream or supply to the load-receiver, said stream being subsequently cut off by the valve when the load is completed, as indicated in Fig. 4. When the load is discharged by the load-receiver, it will rise with the poising side of the beam B, the counterpoised side of said beam dropping; but the return of the shiftable beam or actuator A will be blocked by suitable interlocking-stop mechanism, as will hereinafter appear. When the auxiliary beam or actuator A is released, it will be returned to its normal position by the weight W' thereof, and as said weight drops the arm 31 will be swung to the right, whereby the valve V will be opened through the intermediate connections, the spout S being also returned to its outermost position by reason of its connection with the valve.

The beam B or the arm 17 thereof is provided with the by-pass stop 35, that engages the depending rod 36, which is fixed to the two-part rock-shaft 28, the by-pass being adapted to engage said rod when the valve has nearly reached its closed position, whereby a reduced stream is permitted to enter the load-receiver G for the purpose of completing the partial load therein substantially in the manner disclosed by Letters Patent No. 548,840, granted to me October 28, 1895, to which reference may be had, and hence a more detailed description of these parts is not deemed necessary.

In connection with the supply mechanism a drizzle-catching device, such as D, will be employed, the latter being in the form of a concave receptacle or pan connected with the load-receiver for operation, whereby on the initial tilting action of the load-receiver the drizzle-catching device will be thrown under the discharge end of the valve V, so that any material that may drop from the valve V when the load-receiver G is in its tilted position will be caught by the drizzle-catching device, and hence not wasted, the load-receiver preferably being maintained in its tilted position when the machine is not weighing.

The drizzle-catching device D is pivotally connected in some suitable manner near its forward or discharge end with the rear side of the load-receiver G, as indicated clearly in the several end elevations, and it has pivoted thereto at its rear the suspension-links 40 and 41, respectively, the latter being affixed to a suitable resistance, such as the transverse shaft or bar 42, that joins the rearwardly-bent portions of the two upright members 8 and 9 of the carrier C, the bar being intended to strengthen the carrier C.

In Fig. 3 the load-receiver G is represented having nearly reached its lowest position. On the completion of the load the load-receiver G will be tilted forward by the attendant, and immediately on this action the drizzle-catching device or pan D will be carried forward to a position beneath the discharge end of the valve, as indicated in Fig. 4. When the load-receiver G is returned to its normal position, as indicated in Fig. 2, it will of course swing the drizzle-catching device to its initial position, and any material that may be in the latter will pass into the load-receiver.

In connection with the swinging spout S and with the tilting load-receiver G a pair of reciprocally-effective interlocking stops are provided, they being designated, respectively, by 50 and 51, the last mentioned having along its outer edge the inwardly-extending flange 52. The two stops are illustrated consisting of segmental plates, the stop 50 being affixed to and depending from the rock-shaft 25, while the stop 51 is attached to the rear of the load-receiver G. The shaft 28 is provided with the crank portion 59 to permit the free action of the stop 50. The operation of these stops will be evident from an inspection of Figs. 2 and 4. In Fig. 2 the spout and valve are represented occupying their wide-open positions, so that a stream of comparatively large volume will enter the empty load-receiver, and at this time the flange 52 will be in contact with the under curved face of the interlocking stop 50, so that the stop 50 will block the action of the stop 51, and hence prevent the load-receiver from being tilted.

As the spout S swings rearward and the valve V is operated to effect the cut-off of the stream from the hopper H the interlocking stop 50 will be swung rearward, it crossing the outside curved face of the interlocking stop 51 when the load is completed and the supply-stream is cut off. The load-receiver G will then be tilted so that the outside face of the flange 52 will run substantially along the point 50' of the interlocking stop 50, whereby retractive movement of the latter, and hence of the spout S and valve V, is prevented, this relation continuing so long as the load-receiver G is in its tilted position, as indicated in Fig. 4. As soon as the load is discharged from the load-receiver G said receiver will be caused to rise by the dropping of the beam-weight W, and as said load-receiver rises the interlocking stop 51, acting as a cam, will rock the interlocking stop 50 to the right, thereby further closing the spout S and valve V, but, however, for a very short distance, it being evident that the auxiliary beam or actuator A is shifted relatively to the movement of the beam B by reason of the connections between said auxiliary beam and valve, respectively. On the discharge of the load-receiver G it will be kept in its tilted position until another charge is to be weighed, whereby the drizzle-catching device D is maintained in its effective position, as illustrated in Fig. 4. When a load is to be weighed, the load-receiver G will be returned to its normal position, and as it does so the flange 52 of the interlocking stop 51 will run along the point 50' of the interlocking stop 50 and will pass out of contact therewith when the load-receiver is in its initial position, whereby the spout S, the valve V, and the interlocking stop 50, and consequently the auxiliary beam or valve-actuator A, will be released. When the auxiliary beam or valve-actuator A is released, it will drop to its primary position, and in so doing it will, through the intermediate connections, as hereinbefore specified, open the valve V and spout S to again permit the supply to enter the load-receiver.

For the purpose of receiving the load from the receiver G, I provide the hopper 55, into which the load is discharged, said hopper having the curved forward wall 56 to prevent the material from spilling over the same, and being also fixed to the extension 57 on the upright 2. A receptacle, as R, will be placed on the base or bed 2, under the outlet of the hopper 55, for receiving the charge, and when said receptacle is filled it will be removed.

The operation of the hereinbefore-described apparatus, briefly stated, is as follows: Fig. 2 represents the positions occupied by the respective parts at the commencement of operation, the spout S and valve V being wide open, so that a stream of material from the hopper H will enter the empty load-receiver, and when a certain percentage of the predetermined charge has been received by the load-receiver it, with the poising side of the beam B, will descend, the counterpoised side of the beam ascending and carrying the actuator A therewith, whereby the arm 31 of said actuator is adapted to move the link 30 and the crank-arm 29 therewith, thereby closing the valve V and simultaneously permitting the spout S to shift rearward, the spout S and valve V combining to progressively reduce and subsequently cut off the stream from the hopper H, the stream being cut off when the load is completed. A suitable receptacle, as R, having been previously placed on the supporting-base 2 the load-receiver G will be tilted to deliver its contents into the hopper 55, which directs them into the said receptacle. When it is desired to weigh another load, the load-receiver G will be returned to its normal position by the attendant, and when it has reached such position the remaining parts of the apparatus will be returned to their primary positions, as indicated in Fig. 2. On the initial tilting or discharge movement of the load-receiver G the drizzle-catching device D, by reason of its connection therewith and with the resistance member or carrier C, will be thrown under the discharge edge of the valve V, and this action will be reversed as the load-receiver resumes its load-receiving position.

Having described my invention, I claim—

1. The combination, with weighing mechanism including tilting load-receiver, of stream-supplying means embodying a valve; valve-closing means; a resistance member; and a drizzle-catching device connected, respectively, with the load-receiver and resistance member, whereby, on the discharging movement of the load-receiver, said drizzle-catching device will be thrown under the discharge edge of the valve.

2. The combination, with weighing mechanism including a tilting load-receiver, of stream-supplying means embodying a valve; valve-closing means; and a drizzle-catching device positively connected with the load-receiver for operation, whereby, on the movement of the load-receiver, said drizzle-catching device will be thrown under the discharge edge of the valve.

3. The combination, with a tilting load-receiver, of a carrier for said load-receiver; a scale-beam for supporting said carrier; stream-supplying means embodying a valve; and a drizzle-catching device positively connected with the load-receiver and said carrier.

4. The combination, with weighing mechanism including a tilting load-receiver, of stream-supplying means embodying a valve; valve-closing means; a resistance member; and a drizzle-catching pan pivoted near its discharge edge to the load-receiver and also connected with said resistance member.

5. The combination, with weighing mechanism including a tilting load-receiver, of stream-supplying means embodying a valve; a drizzle-catching device supported independently of the valve and pivoted near its discharge end to the load-receiver; suspension-links connected to the opposite end of the drizzle-catching device; and a member to which said suspension-links are pivoted.

6. The combination, with a load-receiver having projecting trunnions, of a carrier sustaining said trunnions; a scale-beam for supporting said carrier; stream-supplying means embodying a valve; a drizzle-catching device adapted to be carried under the discharge edge of said valve; and connections between said drizzle-catching device and said carrier.

7. The combination, with a tilting load-receiver, of a carrier for said load-receiver; a scale-beam for supporting said carrier; stream-supplying means embodying a valve; a drizzle-catching device pivoted near its forward end to the load-receiver; and a suspension-link pivoted, respectively, to said carrier and drizzle-catching device.

8. The combination, with weighing mechanism embodying a load-receiver, of a hopper; a valve; a swinging spout situated between the valve and the hopper; a plate pivoted, respectively, to said hopper and valve, whereby the valve is adapted to control the action of the spout, said plate also constituting a guard to prevent waste of material; and connections between said valve and the weighing mechanism.

9. The combination, with weighing mechanism embodying a tilting load-receiver, of a hopper; a valve; a swinging spout situated between the valve and the hopper; a connection between the spout and the valve; valve-closing means; a drizzle-catching device connected with the load-receiver; a resistance member connected with said drizzle-catching device; and means situated between the valve and the weighing mechanism, for controlling the action of the valve.

10. The combination, with weighing mechanism including a tilting load-receiver; of a carrier for sustaining said load-receiver, said carrier consisting of two upright members joined at the lower end by a transverse bar from which a rod depends; a guide-link connected, respectively, with said rod and framework; a scale-beam for supporting the carrier; stream-supplying means embodying a valve; valve-closing means; and a drizzle-catching device connected, respectively, with the load-receiver and with said carrier.

11. The combination, with weighing mechanism including a load-receiver, of a hopper; a valve; a swinging spout between the valve and the hopper; a stop connected with said spout; a coöperating stop attached to the load-receiver; stream-supplying means including a valve; a drizzle-catching pan pivoted near its discharge end to the load-receiver; and a resistance member connected with the opposite end of said drizzle-catching pan.

12. The combination, with weighing mechanism including a tilting load-receiver, of a hopper; a valve; a swinging spout situated between the hopper and the valve; a shiftable actuator supported by the weighing mechanism and connected with the valve; a connection between said valve and spout; a stop connected with the spout; a second stop attached to the load-receiver, coöperating with the first-mentioned stop; a drizzle-catching pan pivoted near its discharge end to the load-receiver; suspension-links pivoted to the opposite end of said drizzle-catching pan; and a resistance member to which said suspension-links are attached.

13. The combination, with a tilting load-receiver, of a carrier for sustaining the same; a scale-beam for supporting said carrier; a hopper; a valve; a swinging spout situated between the hopper and the valve and connected with the latter; a drizzle-catching device pivoted near its forward end to the tilting load-receiver; suspension-links pivoted, respectively, to the carrier and to the drizzle-catching device; an actuator shiftably supported by the scale-beam; a link connected with said actuator and also with the valve; and a discharge-hopper situated to receive the material from the load-receiver when the latter is tilted and to direct such material into a suitable receptacle placed below the same.

FRANCIS H. RICHARDS.

Witnesses:
F. N. CHASE,
FRED. J. DOLE.